D. SHERWOOD.
Table-Casters.
No. 6,084. Reissued Oct. 13, 1874.
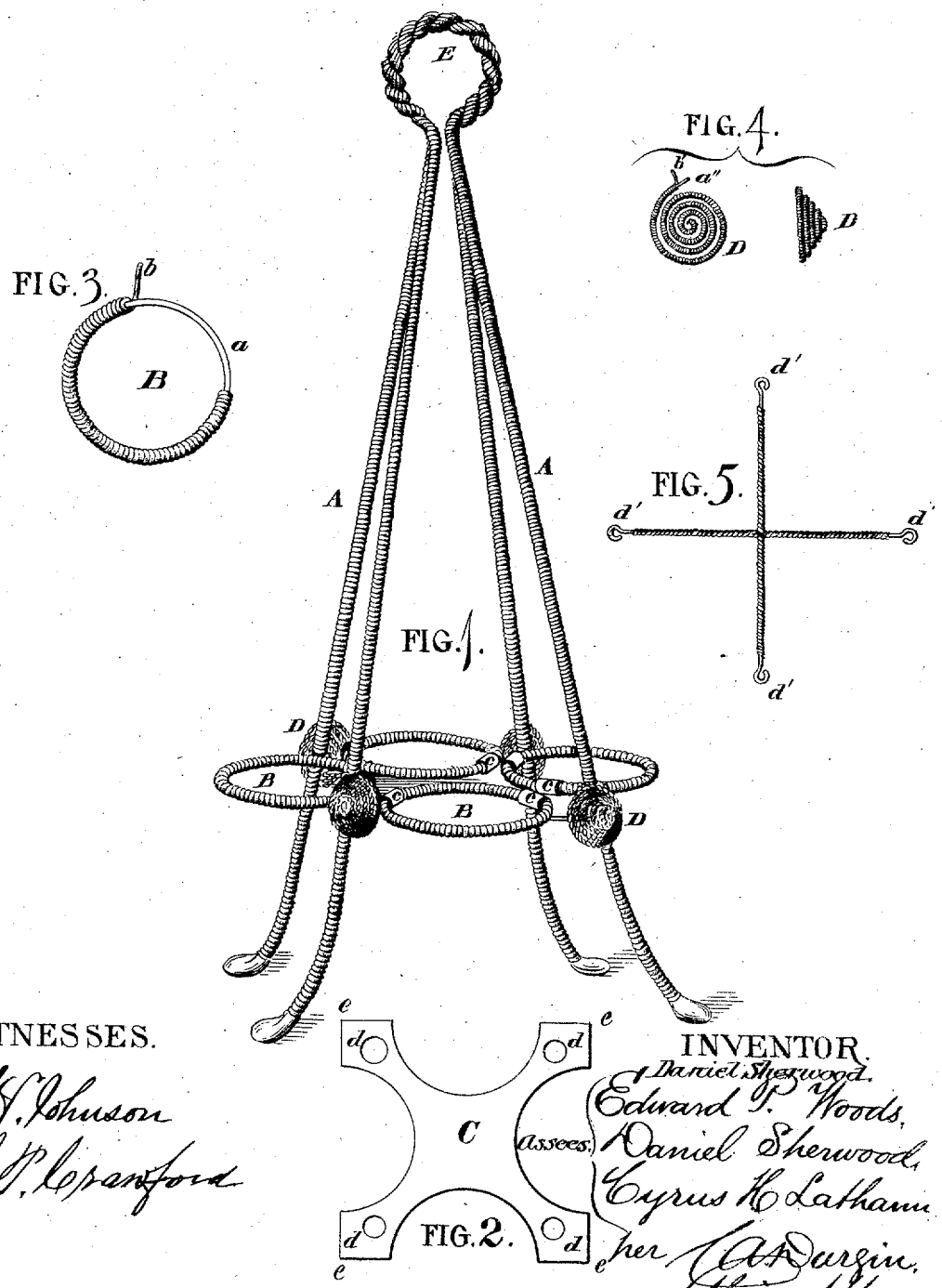
WITNESSES.
E. H. Johnson
J. T. Cranford
INVENTOR.
Daniel Sherwood.
Edward P. Woods,
Daniel Sherwood,
Cyrus H. Latham
assees.
per C. A. Durgin,
their Atty.
THE GRAPHIC CO. PHOTO-LITH. 39 & 41 PARK PLACE, N.Y.

UNITED STATES PATENT OFFICE.

DANIEL SHERWOOD, OF LOWELL, MASSACHUSETTS, ASSIGNOR TO WOODS, SHERWOOD & CO., OF SAME PLACE.

IMPROVEMENT IN TABLE-CASTERS.

Specification forming part of Letters Patent No. 98,432, dated December 28, 1869; reissue No. 6,084, dated October 13, 1874; application filed December 23, 1873.

*To all whom it may concern:*

Be it known that I, DANIEL SHERWOOD, of Lowell, in the county of Middlesex and State of Massachusetts, have invented certain Improvements in Casters or Bottle-Holders, of which the following is a specification:

The invention relates to casters or holders made of wire; and consists in combining with a supporting-frame or holder wound wire rings, which support the bottle. It further consists in combining with the supporting-frame and rings of a caster or holder rosettes, made of twisted or wound wire.

Figure 1 is a perspective view of a caster or holder for bottles. Fig. 2 shows one of the bottle-rings, and the manner of constructing the same. Fig. 3 shows a metal plate used for uniting the parts together. Fig. 4 shows the rosettes. Fig. 5 shows another way or device for uniting the parts together.

The parts which form the supporting-frame, viz., the legs, uprights, and handle, are represented by A A, and the bottle-rings by B B. C represents the metal plate for uniting the rings, legs, and handle together by means of clamps or straps. The rings B are made of wound wire, bent by proper mechanism into circular shape, as shown in Fig. 3, and are secured to the metal plate C by the straps, which embrace the plate as well as the rings. The legs or parts A are inserted in the holes *d* in the metal plate, and the ears *e* are bent down, and lap on the legs, and may be secured in any well-known way. When the cross-bar, Fig. 5, is used to unite the parts together, it is secured by soldering or otherwise to insure strength. At the points where the ears *e* of the metal plate are turned down, or the cross-bar, Fig. 5, secured to the legs, I place scroll-rosettes D, of wound or twisted wire, for the double purpose of concealing the joint and ornamenting the caster or holder.

The operation of winding the wire is as follows: The central wire is held distended by any proper means, and caused to rotate, and the outer wire is wound over it under sufficient pressure or tension to keep it taut and the coil even.

The rosettes may be made of either wound or twisted wire, and in either case after the wire has been twisted or wound they are formed upon a blunt cone of the desired shape, and are united to the caster or holder in any proper way.

It will be obvious that the wire may be wound open or close upon the central wire, as desired, to give variety of effect to the rings, rosettes, or other parts of the caster or holder.

When completed the caster or holder is treated to a metal bath, and all the parts soldered together and tinned at one operation.

Casters, holders, or bottle-rings and rosettes thus made are light, strong, and contribute largely to make a neat, cheap, and highly ornamental article of manufacture.

It is intended to be understood that no claim is made to twisted wire in this application from which the caster or holder is made; but this invention is confined to a caster or holder made from wound wire in contradistinction to twisted wire.

I claim—

The combination, in a table-caster, of the supporting-frame A and the bottle-rings B, made of wound wire, with the brace C, substantially as described.

DANIEL SHERWOOD,

*Of firm of Woods, Sherwood & Co.*

Witnesses:

HORACE F. SLOCUM,

WILLIAM Y. HILL.